United States Patent
Koujima et al.

(10) Patent No.: US 6,821,618 B2
(45) Date of Patent: Nov. 23, 2004

(54) MAGNETIC RECORDING MEDIUM AND PROCESS FOR PRODUCING THE SAME

(75) Inventors: Jun Koujima, Hiroshima-ken (JP); Teruaki Santoki, Ohtake (JP); Kenichi Nakata, Cupertino, CA (US); Takanori Doi, Hatsukaichi (JP); Masaaki Maekawa, Hiroshima (JP); Kousaku Tamari, Cupertino, CA (US)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 10/185,728

(22) Filed: Jul. 1, 2002

(65) Prior Publication Data

US 2003/0008176 A1 Jan. 9, 2003

Related U.S. Application Data

(63) Continuation-in-part of application No. 09/741,890, filed on Dec. 22, 2000, now Pat. No. 6,753,077.

(30) Foreign Application Priority Data

| Mar. 7, 2001 | (JP) | 2001-202824 |
| Mar. 7, 2001 | (JP) | 2001-202825 |
| Mar. 7, 2001 | (JP) | 2001-202826 |

(51) Int. Cl.$^7$ .......... C23C 14/08; B32B 33/00; H01F 10/10; H01F 10/14
(52) U.S. Cl. ............ 428/332; 428/336; 428/694 T; 428/694 TS; 204/192.1
(58) Field of Search .............. 428/329, 332, 428/336, 457, 694 T, 694 TS; 204/192.1

(56) References Cited

U.S. PATENT DOCUMENTS

| 4,642,245 A | * | 2/1987 | Ishii et al. | 204/192.2 |
| 5,080,948 A | * | 1/1992 | Morita et al. | 428/65.3 |
| 6,057,021 A | * | 5/2000 | Ishikawa et al. | 428/65.3 |
| 6,620,531 B1 | * | 9/2003 | Cheng | 428/694 TS |

FOREIGN PATENT DOCUMENTS

| EP | 0 438 212 A1 | 7/1991 |
| EP | 0 673 021 A1 | 9/1995 |
| EP | 0 091 068 A1 | 4/1999 |
| EP | 0 097 162 A1 | 4/1999 |
| EP | 0 936 507 A2 | 8/1999 |
| EP | 0 945 858 A1 | 9/1999 |
| EP | 0 949 608 A1 | 10/1999 |
| EP | 1 089 262 A1 | 4/2001 |
| EP | 1 113 425 A1 | 7/2001 |
| EP | 1 205 914 A1 | 5/2002 |
| JP | 3171601 | 7/1991 |
| WO | 93/23795 | 11/1993 |

OTHER PUBLICATIONS

DataBase WPI Section Ch, Week 199028 Derwent Class G01, AN 1990–214711 XP002178979 JP 146059 Jun. 1990 Abstract.

* cited by examiner

*Primary Examiner*—D. S. Nakarani
*Assistant Examiner*—Nikolas J. Uhlir
(74) *Attorney, Agent, or Firm*—Nixon & Vanderhye P.C.

(57) ABSTRACT

A magnetic recording medium exhibiting a high coercive force and excellent squareness having a substrate, an underlayer formed on the substrate, and a spinel-type iron oxide thin film with maghemite as a main component formed on the underlayer. The spinel-type iron oxide thin film has a thickness (t) of 5 to 50 nm, is constituted by grains having an average grain size (D) of 5 to 30 nm, standard deviation of sizes of grain of not more than 4 nm and a ratio (D/t) of the average grain size (D) to the thickness (t) of less than 1.0, exhibits a coercive force of not less than 159 kA/m (2,000 Oe) and a coercive squareness ratio S* of not less than 0.5:1 in a longitudinal recording medium or a squareness ratio not less than 0.75:1 in a perpendicular recording medium.

8 Claims, No Drawings

MAGNETIC RECORDING MEDIUM AND PROCESS FOR PRODUCING THE SAME

CROSS REFERENCE TO RELATED APPLICATION

This application is a continuation-in-part of application, Ser. No. 09/741,890 filed Dec. 22, 2000, now U.S. Pat. No. 6,753,077.

BACKGROUND OF THE INVENTION

The present invention relates to a magnetic recording medium and a process for producing the magnetic recording medium, and more particularly, to a magnetic recording medium comprising a spinel-type iron oxide thin film comprising maghemite as a main component that is constituted by grains having a small average grain size and an excellent grain size distribution, and exhibits a high coercive force and an excellent squareness, and a process for producing the magnetic recording medium in an industrially and economically useful manner.

In recent years, in magnetic recording apparatuses, it has been more increasingly demanded to provide magnetic recording media having a high-density recording property and a high reliability in order to deal with a large capacity data such as various back-up data, images and audio data. Especially, in hard disk drives, there has been a remarkable tendency of a miniaturization and a high reliability in accordance with information devices being miniaturized and systems used therefor being required to have a high reliability.

In order to satisfy such properties, the magnetic recording media have been strongly required to have not only a high coercive force, but also exhibit a less noise, an excellent durability and a reduced distance (magnetic spacing) between a magnetic recording layer and a magnetic head.

As magnetic recording media having a high coercive force, there are widely known magnetic recording media comprising a substrate and a magnetic thin film formed on the substrate, in case of the hard disk drives.

The magnetic thin films practically used in magnetic recording media are generally classified into magnetic alloy thin films such as Co—Cr-based alloy thin films and magnetic oxide thin films such as spinel-type iron oxide thin film comprising maghemite as a main component.

The magnetic alloy thin films such as Co—Cr-based alloy thin films, have a coercive force as high as not less than 159 kA/m (2,000 Oe). However, these alloy materials themselves tend to be readily oxidized and, therefore, deteriorated in stability as well as magnetic properties with the passage of time.

In order to prevent the deterioration of magnetic properties due to oxidation and enhance the durability, the surface of the magnetic alloy thin film is coated with a protective film composed of carbon, $SiO_2$ or the like having a thickness of usually about 5 to 10 nm, resulting in undesired increase in magnetic spacing corresponding to the thickness of the protective layer.

On the other hand, the magnetic oxide thin films such as spinel-type iron oxide thin film comprising maghemite as a main component are excellent in oxidation resistance or corrosion resistance due to inherent properties of oxides. For this reason, the magnetic oxide thin films can show an excellent stability independent of the passage of time, and a less change in magnetic properties with the passage of time. Further, since the oxides exhibit a higher hardness as compared to metals, the magnetic oxide thin films can also show an excellent durability. As a result, in the magnetic oxide thin film, the thickness of a protective layer which is essential to the magnetic alloy thin film can be reduced or the protect layer can be omitted. Therefore, the magnetic oxide thin films can exhibit a small magnetic spacing as compared to the magnetic alloy thin films, so that the magnetic oxide thin films are optimum ones for the production of high-density magnetic recording media.

It has been attempted to enhance a coercive force of the spinel-type iron oxide thin film comprising maghemite as a main component by incorporating cobalt thereinto. However, with the increase in cobalt content, the spinel-type iron oxide thin film comprising maghemite as a main component tend to be deteriorated in stability with the passage of time due to adverse influences of heat or the like.

With the increasing demand for providing magnetic recording media capable of high-density recording, it has been required to enhance a coercive force of the magnetic recording media. In addition, in order to reduce the noise due to the media themselves, the magnetic recording media have been required to have a thin magnetic layer and a smooth surface. Further, in order to obtain magnetic recording media having a high recording resolution such as an excellent overwrite characteristics or the like, the magnetic recording media have been required to exhibit a high squareness. The squareness mentioned in the present invention means a coercive squareness ratio S* (referred in Magnetic Characterisation of Thin Film Recording Media, published in IEEE TRANSACTIONS ON MAGNETICS, Vol. 29, No. 1, Jan. 1, 1993, pages 286–289) in the case of a longitudinal recording medium, and a squareness ratio S (Mr/Ms) in the case of perpendicular recording medium.

The noises caused from magnetic recording media are mainly classified into transition noises and modulation noises. The transition noises depend upon the size of magnetic grains constituting the magnetic thin film. Therefore, it has been required to reduce an average grain size of grains constituting the magnetic thin film.

Also, in the case where the magnetic recording media have a less smooth surface, modulation noises are caused therefrom. Therefore, in order to reduce the modulation noises, it is necessary to improve a surface smoothness of the magnetic thin film.

On the other hand, in order to reduce the magnetic spacing of magnetic recording media, it is required to minimize flying height of a magnetic head therefrom, and always allow the magnetic head to be flying stably. In conventional hard disk drives, magnetic recording media used therefor have been required to have a certain surface roughness in order to prevent the magnetic head from being absorbed thereon owing to a meniscus force therebetween upon stopping the magnetic head. However, as a result of current improvement in these hard disc systems, magnetic recording media have been no longer required to have such a surface roughness for preventing the magnetic head from being absorbed thereon. Therefore, it has been demanded that a magnetic thin film used in these magnetic recording media exhibits a more excellent surface smoothness.

At present, in the magnetic recording media using a magnetic oxide thin film, since the magnetic thin film has a thickness as small as 50 nm or less, the surface property of the magnetic thin film considerably depends upon that of a substrate. As a result, it has been required not only to use a substrate having an excellent surface smoothness, but also to develop techniques for further smoothening the surface of the magnetic thin film.

As conventional methods for producing spinel-type iron oxide thin film comprising maghemite as a main component, there are known, for example, (1) a method of forming a hematite thin film on a substrate, reducing the hematite thin film at a temperature of 230 to 320° C. to transform the hematite thin film into a spinel-type iron oxide thin film comprising magnetite as a main component, and then oxidizing the spinel-type iron oxide thin film comprising magnetite as a main component at a temperature of 290 to 330° C.; (2) a method of forming a spinel-type iron oxide thin film comprising magnetite as a main component on a substrate, and then oxidizing the spinel-type iron oxide thin film comprising magnetite as a main component at a temperature of 280 to 350° C.; or the like.

Furthermore, as the conventional methods for producing a spinel-type iron oxide thin film comprising maghemite as a main component, there may be exemplified the following methods in addition to the above-mentioned methods (1) and (2):

(3) a method of forming a spinel-type iron oxide thin film on an underlayer composed of Cr, V or the like (Japanese Patent Publication (KOKOKU) No. 55-21451(1980));

(4) a method of conducting a sputtering treatment using a target containing $Fe_3O_4$ as a main component in an inert gas atmosphere containing 1.5 to 5% by volume of oxygen to directly form a film of $\gamma$-$Fe_2O_3$ (Japanese Patent Publication (KOKOKU) No. 62-49724(1987));

(5) a method of decomposing a vapor of a metal chelate, a metal carbonyl or ferrocenes containing Fe, and a metal chelate, a metal carbonyl or ferrocenes containing M, wherein M represents at least one metal selected from the group consisting of Co, Cu, Rh, Ru, Os, Ti, V and Nb; together with an oxygen gas in a high-density pressure-reduced plasma by applying a magnetic field thereto, thereby directly forming a spinel-type iron oxide thin film comprising maghemite as a main component, indicated by a chemical formula: $(Fe_{1-x}M_x)_2O_3$; and x is a number of 0.01 to 0.1, on a substrate (Japanese Patent Application Laid-Open (KOKAI) No. 3-78114 (1991));

(6) a method of treating a spinel-type iron oxide thin film comprising magnetite as a main component at a temperature of less than 240° C. using an electron cyclotron resonance (ECR) plasma to transform the spinel-type iron oxide thin film comprising magnetite as a main component into a spinel-type iron oxide thin film comprising maghemite as a main component (Japanese Patent Application Laid-Open (KOKAI) No. 11-328652(1999));

(7) a method of subjecting a spinel-type iron oxide thin film comprising magnetite as a main component to a plasma treatment in an oxygen atmosphere, and then conducting a heat treatment in air to transform the spinel-type iron oxide thin film comprising magnetite as a main component into a spinel-type iron oxide thin film comprising maghemite as a main component (EP 1089262A1); or the like.

Also, spinel-type iron oxide thin films comprising maghemite as a main component having a small average grain size are described in Japanese Patent Application Laid-Open (KOKAI) Nos. 3-78114(1991) and 4-117624 (1992), Japanese Patent Publication (KOKOKU) No. 6-61130(1994), Japanese Patents Nos. 2840966, 2829524 and 2983053, etc.

As described in "Ceramics", vol. 24, No. 1 (1989), pp. 22–23, a relationship between the film deposition rate and oxygen partial pressure, when an iron oxide compound thin film by a sputtering method, is known, and it indicates that hematite ($\alpha$-$Fe_2O_3$) is deposited with low deposition rate in higher the oxygen partial pressure.

At present, it has been strongly required to provide magnetic recording media comprising a spinel-type iron oxide thin film comprising maghemite as a main component, which is constituted by grains having a small average grain size and an excellent grain size distribution, and exhibits a high coercive force. However, the conventional magnetic recording media fail to satisfy these properties.

Namely, in the above methods (1) and (2), the spinel-type iron oxide thin film comprising magnetite as a main component is taken out into atmospheric air, and further subjected to oxidation treatment at a temperature of 290 to 450° C., thereby obtaining the spinel-type iron oxide thin film comprising maghemite as a main component. However, in these methods, since it is necessary to conduct the heat treatment at a temperature as high as not less than 290° C., there arises such a problem that the obtained thin film is deteriorated in magnetic properties such as a coercive force, squareness or the like, due to migration from the substrate and the underlayer, and the grains contained in the thin film tend to be increased in grain size. Further, since a material of the substrate must be selected from those having an excellent heat resistance, the substrate usable for the thin film is limited to specific ones. In addition, since the thin film is taken out into atmospheric air, there also arise additional problems such as the contamination on the thin film by dust particles.

In the method (3), the obtained spinel-type iron oxide thin film comprising maghemite as a main component fails to show a sufficiently high coercive force required for magnetic recording media despite excellent squareness such as coercive squareness ratio S* thereof.

In the method (4), since the spinel-type iron oxide thin film comprising maghemite as a main component can be produced at a temperature of not more than 100° C., a substrate made of a plastic material such as PET is applicable thereto. However, the coercive force of the obtained magnetic recording medium is as low as not more than 81.2 kA/m (1,020 Oe), thereby failing to provide a magnetic recording medium having a sufficiently high coercive force.

In the method (5) for producing the cobalt-containing spinel-type iron oxide thin film comprising maghemite as a main component, since such a spinel-type iron oxide thin film comprising maghemite as a main component can be produced at a substrate temperature of about 50° C., a substrate made of a plastic material having a less heat resistance, such as polyester, polystyrene terephthalate and polyamide, can be used therefor. However, the resultant magnetic recording medium exhibits a coercive force of about 135 kA/m (1,700 Oe) at most.

In the method (6), the spinel-type iron oxide thin film comprising maghemite as a main component can be produced at a treating temperature of less than 240° C. only by a vacuum process and, therefore, can be prevented from undergoing adverse influences such as contamination and migration, resulting in production of magnetic recording medium having an excellent surface smoothness. However, the obtained magnetic recording medium fails to show a sufficiently high squareness.

In the method (7), it is possible to produce a magnetic recording medium having an excellent surface smoothness and a high coercive force. However, since the magnetic recording medium is heat-treated in atmospheric air, it is difficult to inhibit the migration from the underlayer and the substrate. In addition, as shown in the below-mentioned Comparative Examples, the obtained magnetic recording medium fails to show an excellent squareness such as coercive squareness ratio S*.

Further, in the methods described in Japanese Patent Application Laid-Open (KOKAI) Nos. 3-78114(1991) and 4-117624(1992) and Japanese Patent Publication (KOKOKU) No. 6-61130(1994), it is possible to produce a spinel-type iron oxide thin film comprising maghemite as a main component having a thickness as small as not more than 50 nm. However, the obtained spinel-type iron oxide thin film comprising maghemite as a main component fails to exhibit a sufficiently high coercive force. Furthermore, in the methods described in Japanese Patent Nos. 2840966, 2829524 and 2983053, it is possible to produce a spinel-type iron oxide thin film comprising maghemite as a main component, which is constituted by grains having a small average grain size, and has a thickness as small as not more than 50 nm. However, the obtained magnetic recording medium fails to show a sufficiently high coercive force.

As a result of the present inventors' earnest studies for solving the above problems, it has been found that by forming an underlayer on a substrate, after conducting a sputtering treatment in an oxygen-rich atmosphere, conducting a reactive sputtering to form a spinel-type iron oxide thin film comprising magnetite as a main component on the underlayer, and then oxidizing the spinel-type iron oxide thin film comprising magnetite as a main component to transform the spinel-type iron oxide thin film into a spinel-type iron oxide thin film comprising maghemite as a main component, the obtained spinel-type iron oxide thin film comprising maghemite as a main component is constituted by grains having a small average grain size and an excellent grain size distribution, and exhibits a high coercive force and an excellent squareness with a thickness (t) as small as 5 to 50 nm. The present invention has been attained based on the above finding.

SUMMARY OF THE INVENTION

An object of the present invention is to provide a magnetic recording medium comprising a spinel-type iron oxide thin film comprising maghemite as a main component, which is constituted by grains having a small average grain size and an excellent grain size distribution, and exhibits a high coercive force and a high squareness.

Another object of the present invention is to provide a process for producing a magnetic recording medium comprising a spinel-type iron oxide thin film comprising maghemite as a main component, which is constituted by grains having a small average grain size and an excellent grain size distribution, and exhibits a high coercive force and a high squareness.

To accomplish the aims, in the first aspect of the present invention, there is provided a magnetic recording medium, comprising:

a substrate;

an underlayer formed on the substrate; and a spinel-type iron oxide thin film comprising maghemite as a main component formed on the underlayer, said spinel-type iron oxide thin film having a thickness (t) of 5 to 50 nm, being constituted by grains having an average grain size (D) of 5 to 30 nm, a standard deviation of grain sizes of not more than 4 nm and a ratio (D/t) of the average grain size (D) to the thickness (t) of less than 1.0, and exhibiting a coercive force of not less than 159 kA/m (2,000 Oe) and a coercive squareness ratio S* of not less than 0.5:1 in a longitudinal recording medium or a squareness ratio not less than 0.75:1 in a perpendicular recording medium.

In a second aspect of the present invention, there is provided a magnetic recording medium, having a center-line mean ($R_a$) of 0.1 to 1.0 nm and a maximum height ($R_{max}$) of 1 to 12 nm, comprising:

a substrate;

an underlayer formed on the substrate; and a spinel-type iron oxide thin film comprising maghemite as a main component formed on the underlayer, said spinel-type iron oxide thin film having a thickness (t) of 5 to 50 nm, being constituted by grains having an average grain size (D) of 5 to 30 nm, a standard deviation of grain sizes of not more than 4 nm and a ratio (D/t) of the average grain size (D) to the thickness (t) of less than 1.0, and exhibiting a coercive force of not less than 159 kA/m (2,000 Oe) and a coercive squareness ratio S* of not less than 0.5:1 in a longitudinal recording medium or a squareness ratio not less than 0.75:1 in a perpendicular recording medium.

In a third aspect of the present invention, there is provided a process for producing a magnetic recording medium, comprising:

forming an underlayer on a substrate;

subjecting the underlayer to sputtering treatment in an oxygen-rich atmosphere using an Fe target, an Fe alloy target or a target comprising iron oxide as a main component;

conducting a reactive sputtering using an Fe target, an Fe alloy target or a sputtering using a target comprising iron oxide as a main component to form a spinel-type iron oxide thin film comprising magnetite as a main component on the underlayer; and oxidizing the spinel-type iron oxide thin film comprising magnetite as a main component to transform into a spinel-type iron oxide thin film comprising maghemite as a main component.

In a fourth aspect of the present invention, there is provided a process for producing a magnetic recording medium, comprising:

forming an underlayer comprising a Cr metal thin film or a Cr alloy thin film on a substrate;

subjecting the underlayer to sputtering treatment in an oxygen-rich atmosphere using an Fe target, an Fe alloy target or a target comprising iron oxide as a main component; and conducting a reactive sputtering using an Fe target, an Fe alloy target or a sputtering using a target comprising iron oxide as a main component to form a spinel-type iron oxide thin film comprising maghemite as a main component on the underlayer.

DETAILED DESCRIPTION OF THE INVENTION

First, the magnetic recording medium of the present invention is described.

The magnetic recording medium of the present invention comprises a substrate, an underlayer formed on the substrate, and a spinel-type iron oxide thin film comprising maghemite as a main component, formed on the underlayer.

As the substrate used in the present invention, there may be used plastic substrates or films made of polyethylene naphthalate (PEN), polyethylene terephthalate (PET), etc.;

glass substrates; aluminum substrates; or the like. Among these substrates, the glass substrates are preferred.

In the present invention, as the underlayer for the spinel-type iron oxide thin film comprising maghemite as a main component, there may be used a single-layered or multi-layered underlayer composed of at least one thin film selected from the group consisting of oxide thin films of a NaCl-type structure, and metal or alloy thin films of a bcc structure or a B2 structure.

Examples of the oxide thin films of a NaCl-type structure may include nickel oxide thin film, magnesium oxide thin film, cobalt oxide thin film or the like. Examples of the metal or alloy thin films of a bcc structure may include a Cr metal thin film, Cr alloy films such as a Cr—Mo thin film, a Cr—W thin film, a Cr—V thin film and a Cr—Ti thin film, a V metal thin film, V alloy films, or the like. Examples of the alloy thin films of a B2 structure may include a Ni—Al thin film, a Fe—Al thin film or the like. Among these thin films, the nickel oxide thin film, the magnesium oxide thin film, the Cr metal thin film and the Cr—Mo alloy thin film are preferred.

The underlayer used in the present invention has a thickness of preferably 10 to 200 nm, more preferably 10 to 150 nm, still more preferably 10 to 100 nm. When the thickness of the underlayer is more than 200 nm, the obtained spinel-type iron oxide thin film comprising maghemite as a main component may tend to be deteriorated in surface smoothness.

Also, a crystal orientation and a spacing of crystal lattice planes of the underlayer are appropriately controlled by film deposition conditions. Since the crystal orientation of the formed magnetic recording thin film follow-up to the orientation of the underlayer, it becomes possible to allow the magnetic recording medium to be suitably used for longitudinal recording and perpendicular recording purposes by controlling the orientation of the obtained magnetic recording medium.

The spinel-type iron oxide thin film comprising maghemite as a main component according to the present invention has a thickness (t) of usually 5 to 50 nm, preferably 6 to 45 nm, more preferably 7 to 40 nm. When the thickness of the spinel-type iron oxide thin film is more than 50 nm, it becomes difficult to uniformly magnetize the magnetic thin film up to a deep portion thereof when signals are recorded thereon, thereby failing to obtain good recording and reproducing characteristics. Also, the thickness of the spinel-type iron oxide thin film is preferably as small as possible in the consideration of reduction of media noises.

The spinel-type iron oxide thin film of the present invention is a spinel-type iron oxide thin film comprising maghemite as a main component, which has a structure, represented by the general formula "$\gamma$-$Fe_2O_3$". Meanwhile, the spinel-type iron oxide thin film of the present invention may contain $Fe^{2+}$ in a small amount, preferably in an amount of not more than 20% by weight.

The spinel-type iron oxide thin film comprising maghemite as a main component may further contain a predetermined amount of cobalt for improving a coercive forced thereof. The Co content of the spinel-type iron oxide thin film is preferably not more than 20% by weight, more preferably 1 to 10% by weight based on Fe. When the Co content is more than 20% by weight, it may be difficult to obtain a magnetic recording medium having an excellent stability independent of the passage of time.

Meanwhile, the spinel-type iron oxide thin film comprising maghemite as a main component according to the present invention may contain, if required, an other element than cobalt such as Mn, Ni, Cu, Ti, Zn, Cr and B which may be ordinarily used for improving various properties thereof, at a molar ratio of the element to Fe of about 0.005:1 to about 0.04:1. The addition of these elements facilitates the production of magnetic recording media having a high coercive force and an excellent squareness.

The spinel-type iron oxide grains containing maghemite as a main component, which constitute the thin film of the present invention, have an average grain size (D) of usually 5 to 30 nm, preferably 5 to 25 nm, more preferably 5 to 20 nm. The average grain size of the spinel-type iron oxide grains means an average value of the diameter of each of grains observed from an image of the surface of the spinel-type iron oxide thin film, obtained by an atomic force microscope.

The ratio (D/t) of the average grain size (D) of the spinel-type iron oxide grains to the thickness (t) of the spinel-type iron oxide thin film comprising maghemite as a main component is usually less than 1.0, preferably not more than 0.90, more preferably 0.40 to 0.80. When the average grain size (D) of the spinel-type iron oxide grains is more than 30 nm, the noise generated from the obtained magnetic recording medium tends to become large. When the ratio (D/t) is not less than 1.0, it may be difficult to attain the effects of the present invention.

The spinel-type iron oxide grains containing maghemite as a main component, which constitute the thin film of the present invention, have a standard deviation of grain sizes of usually not more than 4 nm, preferably not more than 3 nm. When the standard deviation is more than 4 nm, the noise generated from the obtained magnetic recording medium tends to become large.

Among various parameters of the surface roughness of the spinel-type iron oxide thin film comprising maghemite as a main component, the center-line mean ($R_a$) thereof is preferably 0.1 to 1.0 nm, more preferably 0.1 to 0.9 nm, still more preferably 0.1 to 0.8 nm; and the maximum height ($R_{max}$) thereof is preferably 1 to 12 nm, more preferably 1 to 10 nm, still more preferably 1 to 9 nm. When the center-line mean ($R_a$) and the maximum height ($R_{max}$) are out of the above-specified ranges, the obtained thin film may tend to be deteriorated in surface property and fail to provide high-density magnetic recording media.

The spinel-type iron oxide thin film comprising maghemite as a main component in magnetic recording media of a longitudinal recording type has a coercive squareness ratio S* of usually not less than 0.50:1, preferably 0.60:1 to 0.95:1, more preferably 0.65:1 to 0.95:1. When the coercive squareness ratio S* is out of the above-specified range, the obtained spinel-type iron oxide thin film may tend to be deteriorated in overwrite characteristics and, therefore, be inapplicable to magnetic recording media. The spinel-type iron oxide thin film comprising maghemite as a main component in magnetic recording media of a perpendicular recording type has a squareness ratio S (Mr/Ms) of usually not less than 0.75:1, preferably 0.80:1 to 1.0:1. When the squareness (Mr/Ms) is out of the above-specified range, the noise generated from the obtained thin film may become large, thereby failing to provide suitable magnetic recording media.

The magnetic recording medium having an underlayer composed of the oxide thin film of the present invention has a surface electrical resistance value of preferably 50 to 3,000 M$\Omega$, more preferably 50 to 2,500 M$\Omega$, still more preferably 50 to 2,000 M$\Omega$. When the surface electrical resistance value is less than 50 MΩ, it is expected that a large amount of magnetite may still remain in the spinel-type iron oxide thin film comprising maghemite as a main component, resulting in low coercive force thereof. Further, when the metal thin film or the alloy thin film of a bcc structure or a B2 structure is used as the underlayer, the obtained magnetic recording medium preferably has a surface electrical resistance value of preferably 0.01 to 10 MΩ.

The magnetic recording medium of the present invention has a coercive force value of usually not less than 159 kA/m (2,000 Oe), preferably 199 to 1,194 kA/m (2,500 to 15,000 Oe), more preferably 199 to 955 kA/m (2,500 to 12,000 Oe), still more preferably 318 to 637 kA/m (4,000 to 8,000 Oe); a saturation magnetization value (value of magnetization when applying a magnetic field of 1,590 kA/m (20 kOe) thereto) of preferably 29 to 53 Wb/m$^3$ (230 to 420 emu/cm$^3$), more preferably 30 to 53 Wb/m$^3$ (240 to 420 emu/cm$^3$), still more preferably 31 to 53 Wb/m$^3$ (250 to 420 emu/cm$^3$).

Next, the process for producing the magnetic recording medium according to the present invention is described.

The magnetic recording medium of the present invention can be produced by:

(A) A method of forming an underlayer on the substrate, subjecting the formed underlayer to sputtering treatment in an oxygen-rich atmosphere using an Fe target, an Fe alloy target or a target comprising iron oxide as a main component, conducting a reactive sputtering using an Fe target, an Fe alloy target or a sputtering using a target comprising iron oxide as a main component to form a spinel-type iron oxide thin film comprising magnetite as a main component on the underlayer, and then oxidizing the spinel-type iron oxide thin film comprising magnetite as a main component to transform the spinel-type iron oxide thin film into a spinel-type iron oxide thin film comprising maghemite as a main component; or (B) a method of forming an underlayer composed of a Cr metal thin film or a Cr alloy thin film on the substrate, (i) subjecting the formed underlayer to sputtering treatment in an oxygen-rich atmosphere using an Fe target, an Fe alloy target or a target comprising iron oxide as a main component, conducting a reactive sputtering using an Fe target, an Fe alloy target or a sputtering using a target comprising iron oxide as a main component to form a spinel-type iron oxide thin film comprising magnetite as a main component on the underlayer, and then oxidizing the spinel-type iron oxide thin film comprising magnetite as a main component to transform the spinel-type iron oxide thin film into a spinel-type iron oxide thin film comprising maghemite as a main component, or (ii) subjecting the formed underlayer to sputtering treatment in an oxygen-rich atmosphere using an Fe target, an Fe alloy target or a target comprising iron oxide as a main component; and conducting a reactive sputtering using an Fe target, an Fe alloy target or a sputtering using a target comprising iron oxide as a main component to form a spinel-type iron oxide thin film comprising maghemite as a main component on the underlayer.

In particular, the production method (A) is preferred since the grains constituting the obtained thin film have a smaller average grain size.

In the present invention, the underlayer is first formed on the substrate by an ordinary method. For example, an oxide underlayer of a NaCl-type structure may be produced by conducting a reactive sputtering using a metal target composed of Ni, Mg or Co in a mixed atmosphere composed of a sputtering gas and an O$_2$ gas; or by conducting a sputtering using a target composed of NiO, MgO or CoO. Also, the alloy thin film of a bcc structure or a B2 structure may be formed by conducting a sputtering using various metal or alloy targets. Meanwhile, as the sputtering gas, there may be used at least one gas selected from the group consisting of Ar, Kr and Xe.

The sputtering treatment in an oxygen-rich atmosphere means a sputtering process conducted under such an oxygen partial pressure which allows iron ions having a high oxidizing ability to eject from the target and adhere on the surface of the underlayer. That is, when using an iron or iron alloy target, since an oxidation speed of the surface of the iron or iron alloy target is faster than the film formation speed, the sputtering treatment is conducted under such an oxygen partial pressure capable of not only oxidizing the surface of the target but also considerably decreasing the film deposition speed. In addition, when using a target containing iron oxide as a main component, the sputtering treatment is usually conducted under an oxygen partial pressure capable of forming hematite ($\alpha$-Fe$_2$O$_3$) on the underlayer.

The sputtering apparatus usable in the present invention is not particularly restricted, and may be any of generally used sputtering apparatuses including known sputtering apparatuses comprising a target holder, a substrate holder, a vacuum chamber, etc., for example, "C-3102" (manufactured by ANELBA CO., LTD.), "SH-250H-T06" (manufactured by NIHON SHINKU GIJUTSU CO., LTD.) or the like.

In the above production methods (A) and (B), when forming the spinel-type iron oxide thin film comprising magnetite as a main component, an iron or iron alloy target is sputtered therein while introducing a mixed gas composed of oxygen and a rare gas, and controlling an oxygen flow rate (CCM) in the mixed gas as well as a deposition rate (nm/sec), thereby forming the thin film on the underlayer. Meanwhile, as the rare gas, there may be used at least one gas selected from the group consisting of Ar, Kr and Xe.

The oxygen flow rate (CCM) in the mixed gas required for achieving a suitable magnetite deposition rate (nm/sec) varies depending upon various conditions used for obtaining the spinel-type iron oxide thin film comprising magnetite as a main component by reactive sputtering of the iron or iron alloy target, for example, kind and structure of sputtering apparatus used, film formation rate, total gas pressure, substrate temperature, surface area of sputtering target, etc.

In particular, when using the iron or iron alloy target, the oxygen-rich atmosphere in a sputtering film-forming apparatus used in the present invention, means an atmosphere satisfying the condition represented by the formula:

$$Fo_2/R \geq 12$$

wherein Fo$_2$ is an oxygen flow rate (CCM) in oxidation treatment; and R is a magnetite deposition rate.

For example, in the case of R=2.0 (nm/sec), the oxygen flow rate (Fo$_2$) capable of oxidizing the target is not less than 24 (CCM).

In the above production method (A), the sputtering treatment for treating the underlayer in an oxygen-rich atmosphere using a Fe target, a Fe alloy target or a target comprising iron oxide as a main component is conducted at a substrate temperature of usually 20 to 200° C., preferably 20 to 100° C. When the substrate temperature is out of the above-specified range, it may be difficult to sufficiently attain effects of the present invention.

In the above production method (A), the sputtering time for subjecting the underlayer to sputtering treatment in an oxygen-rich atmosphere using an Fe target, an Fe alloy target or a target comprising iron oxide as a main component is preferably 1 to 20 seconds, more preferably 1 to 15 seconds, still more preferably 2 to 10 seconds. When the sputtering time is less than 1 second, it may be difficult to sufficiently attain effects of the present invention. When the sputtering time is more than 20 seconds, the obtained thin film may tend to be deteriorated in magnetic properties.

The substrate temperature used upon forming the spinel-type iron oxide thin film comprising magnetite as a main component in the production method (A) is preferably 30 to 250° C., more preferably 80 to 200° C.

In the above production method (A), the thus formed spinel-type iron oxide thin film comprising magnetite as a main component is then oxidized and transformed into a spinel-type iron oxide thin film comprising maghemite as a main component. More specifically, the transformation of the spinel-type iron oxide thin film comprising magnetite as a main component into the spinel-type iron oxide thin film comprising maghemite as a main component may be conducted by any of (a) a method of subjecting the spinel-type iron oxide thin film comprising magnetite as a main component to sputtering treatment in an oxygen-rich atmosphere using a Fe target, a Fe alloy target or a target comprising iron oxide as a main component; (b) a method of heat-treating the spinel-type iron oxide thin film comprising magnetite as a main component in an oxygen-containing atmosphere in a sputtering chamber; and (c) a method of heat-treating the spinel-type iron oxide thin film comprising magnetite as a main component in air. Among these methods, in the consideration of the surface smoothness of the obtained magnetic recording medium, the above method (a) of conducting the sputtering treatment in an oxygen-rich atmosphere is preferred.

In the sputtering treatment used in the method (a) which is conducted in an oxygen-rich atmosphere for the purpose of transforming the spinel-type iron oxide thin film comprising magnetite as a main component into a spinel-type iron oxide thin film comprising maghemite as a main component, there may be used the same substrate temperature and sputtering time as used in the method (A) of obtaining maghemite by subjecting magnetite to sputtering treatment in an oxygen-rich atmosphere using a Fe target, a Fe alloy target or a target comprising iron oxide as a main component. More specifically, the substrate temperature is preferably 20 to 250° C., more preferably 80 to 200° C.; and the sputtering time is preferably 1 to 30 seconds, more preferably 1.5 to 20 seconds, still more preferably 2 to 10 seconds.

In the method (b), the spinel-type iron oxide thin film comprising magnetite as a main component is heated in an oxygen-containing atmosphere at a temperature of preferably 150 to 300° C.

In the method (c), the spinel-type iron oxide thin film comprising magnetite as a main component is heat-treated in air at a temperature of preferably 280 to 350° C. The heat-treating time is preferably 1 to 2 hours.

Also, in the sputtering treatment used in the production method (B) which is conducted in an oxygen-rich atmosphere using an Fe target, an Fe alloy target or a target comprising iron oxide as a main component, the substrate temperature is usually 100 to 250° C., preferably 150 to 250° C. When the substrate temperature is out of the above-specified range, it may be difficult to attain sufficient effects of the present invention. The sputtering time used for the sputtering treatment in an oxygen-rich atmosphere according to the present invention, is preferably 1 to 20 seconds, more preferably 1 to 10 seconds. When the sputtering time is less than 1 second, it may be difficult to attain sufficient effects of the present invention. When the sputtering time is more than 20 seconds, the obtained thin film may be deteriorated in magnetic properties.

In the production method (B) of the present invention, the substrate temperature used upon forming the spinel-type iron oxide thin film comprising maghemite as a main component is preferably 100 to 250° C., more preferably 150 to 250° C.

In the present invention, the sputtering treatment for treating the underlayer in an oxygen-rich atmosphere and the sputtering treatment for forming the spinel-type iron oxide thin film comprising magnetite as a main component and transforming the spinel-type iron oxide thin film comprising magnetite as a main component into the spinel-type iron oxide thin film comprising maghemite as a main component may be continuously conducted in the same sputtering chamber. Alternatively, the sputtering treatment for treating the underlayer in an oxygen-rich atmosphere and the sputtering for forming the spinel-type iron oxide thin film comprising magnetite as a main component may be respectively conducted in separate sputtering chambers without removing the obtained thin film into atmospheric air. In the consideration of industrial productivity, it is preferred to respectively conduct the sputtering under an oxygen-rich atmosphere and the formation of the spinel-type iron oxide thin film comprising magnetite as a main component in separate chambers.

The point of the present invention is that the spinel-type iron oxide thin film comprising maghemite as a main component constituted by grains having a small average grain size and an excellent grain size distribution can show a high coercive force and a high squareness despite a small thickness thereof.

In general, when the thickness of the spinel-type iron oxide thin film comprising maghemite as a main component is reduced, there is such a tendency that the average grain size of maghemite grains constituting the thin film is also decreased. According to the present invention, it is possible to produce a thin film constituted by maghemite grains having a much smaller average grain size as compared to the thickness of the thin film.

Further, in the magnetic recording medium of the present invention, the maghemite grains can be prevented from increasing in size. As a result, it becomes possible to obtain a spinel-type iron oxide thin film comprising maghemite as a main component constituted by grains having a small average grain size and an excellent grain size distribution. In particular, it is considered that since the above production methods (A)–(a) and (B)–(ii), etc. are conducted at a temperature as low as not more than 250° C. through a total process thereof, the grains constituting the thin film can be prevented from increasing in size. In addition, since the total process is conducted at a low temperature, the undesired migration from the substrate and the underlayer can be sufficiently inhibited and, therefore, it can prevent that the obtained spinel-type iron oxide thin film comprising maghemite as a main component is deteriorated in surface smoothness.

In the production methods of the present invention, after the underlayer is subjected to sputtering treatment in an oxygen-rich atmosphere using an Fe target, an Fe alloy target or a target comprising iron oxide as a main component to deposit active iron ions on the underlayer, the spinel-type iron oxide thin film comprising magnetite as a main component is formed on the underlayer, and then is oxidized and transformed into a spinel-type iron oxide thin film comprising maghemite as a main component. Therefore, the active iron ions act as nuclei for grain growth, resulting in promoted fineness of the obtained grains. In addition, the nuclei for grain growth also serve as oxidation active sites, resulting in promoted transformation into maghemite and formation of uniform spinel-type iron oxide thin film comprising maghemite as a main component as a total. For these reasons, the grains constituting the spinel-type iron oxide thin film comprising maghemite as a main component can be prevented from locally increasing in crystal size thereof owing to lack of oxygen. Furthermore, since the above treatment is conducted at a low temperature as compared to conventional heat treatments in air, it is considered that the grains constituting the thin film can be prevented from increasing in size, so that the obtained thin film can maintain a good surface smoothness.

Meanwhile, the reason why the spinel-type iron oxide thin film comprising magnetite as a main component can be transformed into the spinel-type iron oxide thin film comprising maghemite as a main component when subjecting the spinel-type iron oxide thin film comprising magnetite as a main component to sputtering treatment in an oxygen-rich atmosphere using a Fe target, an Fe alloy target or an target comprising iron oxide as a main component, is considered by the present inventors as follows. That is, when sputtering $Fe^{3+}$ toward the spinel-type iron oxide thin film comprising magnetite as a main component, the sputtered $Fe^{3+}$ acts as an oxidizing agent on the spinel-type iron oxide thin film comprising magnetite as a main component, thereby promoting the oxidation reaction of $Fe^{2+} \rightarrow Fe^{3+} + e^{-}$. In addition, although $Fe^{3+}$ acting as an oxidizing agent is reduced into $Fe^{2+}$, the above oxidation reaction is caused again, resulting in occurrence of the repeated reaction. As a result, it is considered that the total portion of the spinel-type iron oxide thin film comprising magnetite as a main component is transformed into maghemite to form a uniform spinel-type iron oxide thin film comprising maghemite as a main component.

Hitherto, in order to obtain a thin film having a high coercive force which is applicable for the production of a magnetic recording medium, it is necessary to transform a spinel-type iron oxide thin film comprising magnetite as a main component directly produced by reactive sputtering, etc., into a spinel-type iron oxide thin film comprising maghemite as a main component because the former spinel-type iron oxide thin film comprising magnetite as a main component shows merely a low coercive force. On the contrary, in the production method (B)-(ii) of the present invention, it is possible to directly form a spinel-type iron oxide thin film comprising maghemite as a main component with a high coercive force on the substrate during a vacuum process, resulting in considerable reduction in treating time of the process. Thus, especially, the production method (B)-(ii) of the present invention is industrially and economically advantageous.

In the magnetic recording medium of the present invention, the spinel-type iron oxide thin film comprising maghemite as a main component can exhibit not only a high coercive force and a high squareness, but also can be constituted by grains having a small average grain size and an excellent grain size distribution. Therefore, the magnetic recording medium can be suitably used as a high-density recording magnetic recording medium.

Further, in the process for producing the magnetic recording medium according to the present invention, it is possible to obtain a spinel-type iron oxide thin film comprising maghemite as a main component having a small thickness because the grains constituting the thin film have a small average grain size. Accordingly, the process of the present invention enables a magnetic recording medium having a low noise, a high coercive force and a high squareness to be produced in an industrially and economically useful manner and, therefore, is suitable as a production process of magnetic recording media.

EXAMPLES

The present invention is described in more detail by Examples and Comparative Examples, but the Examples are only illustrative and, therefore, not intended to limit the present invention.

Various properties were evaluated by the following methods.

(1) The thickness of the magnetic thin film was measured as follows. That is, before deposition of the thin film, a line was drawn with a felt pen on a substrate or underlayer. Then, after deposition of the thin film on the substrate or underlayer, the drawn line and the film portion deposited thereon were simultaneously removed using an organic solvent. The thus formed stepped portion was measured by a tracer-type surface roughness tester (manufactured by NIHON SHINKU GIJUTSU CO., LTD.) or an atomic force microscope (AFM: manufactured by DIGITAL INSTRUMENTS (D.I.)). The thickness of the thin film was calculated from the measured value.

(2) The crystal orientation of the obtained thin film was identified by X-ray diffraction method using an X-ray diffractometer "RINT2500" (manufactured by RIGAKU DENKI CO., LTD.).

(3) The oxidation (transformation) of the spinel-type iron oxide thin film comprising magnetite as a main component into the spinel-type iron oxide thin film comprising maghemite as a main component was determined by measuring the change in surface electrical resistance as one of indices therefor.

That is, in the case where an oxide thin film is formed as the underlayer, the surface electrical resistance of the spinel-type iron oxide thin film comprising magnetite as a main component is 0.001 to 0.5 M$\Omega$, and the surface electrical resistance of the spinel-type iron oxide thin film comprising maghemite as a main component is increased to 50 to 3,000 M$\Omega$. In the case where a metal thin film or an alloy thin film is formed as the underlayer, the surface electrical resistance of the spinel-type iron oxide thin film comprising magnetite as a main component is 0.02 to 1 k$\Omega$, and the surface electrical resistance of the spinel-type iron oxide thin film comprising maghemite as a main component is increased to 0.01 to 10 M$\Omega$. The surface electrical resistance of the respective thin films was measured by an Insulation Tester DM-1527 (manufactured by SANWA DENKI KEIKI CO., LTD.) by setting the distance between two probes to 10 mm.

(4) The surface roughness values (center-line mean roughness ($R_a$) and maximum height ($R_{max}$)) of the spinel-type iron oxide thin film were measured using an atomic force microscope (AFM: manufactured by DIGITAL INSTRUMENTS (D.I.)) with respect to a 5 $\mu$m-square area of the surface.

(5) The average grain size and standard deviation of grain sizes of grains at the surface of the spinel-type iron oxide thin film comprising maghemite as a main component was calculated from 400 grains diameter measured on an enlarged images of the 500 nm-square area of the surface obtained by an atomic force microscope (AFM: manufactured by DIGITAL INSTRUMENTS (D.I.)).

(6) The magnetic properties such as coercive force, saturation magnetization of the magnetic recording medium, are expressed by values measured by "Vibrating Sample-type Magnetometer VSM" (manufactured by TOEI KOGYO CO., LTD.). The magnetic properties of the magnetic recording medium were measured by applying a maximum magnetic field of 1,590 kA/m (20 kOe) thereto.

Example 1

<Production of Magnetic Recording Medium>

By using an in-line disk sputtering apparatus "C-3102" (manufactured by ANELBA CO., LTD.) and setting a distance between a glass substrate and a metal target (Ni) to 85 mm, the metal target was sputtered at ordinary temperature in a mixed gas atmosphere containing oxygen and argon and having an oxygen flow rate of 10 CCM, an oxygen partial pressure of 0.015 Pa and a total pressure of 0.094 Pa, thereby forming an NiO thin film having a thickness of 50 nm at a deposition rate of 1 nm/sec on the glass substrate.

Then, a metal alloy (Fe+8 wt. % Co) target was sputtered on the obtained NiO thin film for 4 seconds at room temperature in an oxygen-rich mixed gas atmosphere containing oxygen and argon and having an oxygen flow rate of 74 CCM, an oxygen partial pressure of 0.12 Pa and a total pressure of 0.40 Pa.

Next, a metal alloy (Fe+8 wt. % Co) target was sputtered at 150° C. in a mixed gas atmosphere containing oxygen and argon and having an oxygen flow rate of 22 CCM, an oxygen partial pressure of 0.03 Pa and a total pressure of 0.38 Pa, thereby forming a 20 nm-thick Co-containing magnetite thin film at a deposition rate of 2 nm/sec on the NiO thin film.

Successively, the obtained Co-containing magnetite thin film was treated within the same apparatus by sputtering a metal alloy (Fe+8 wt. % Co) target for 4 seconds at 150° C. in an oxygen-rich mixed gas atmosphere containing oxygen and argon and having an oxygen flow rate of 74 CCM, an oxygen partial pressure of 0.12 Pa and a total pressure of 0.40 Pa, thereby forming a Co-containing maghemite thin film.

The thus obtained Co-containing maghemite thin film was a longitudinal recording medium having a thickness of 20 nm. As to the surface roughness of the Co-containing maghemite thin film, the center-line mean ($R_a$) thereof was 0.6 nm; and the maximum height ($R_{max}$) thereof was 5.9 nm. In addition, the Co-containing maghemite thin film exhibited a coercive force of 352 kA/m (4,429 Oe), and a coercive squareness S* of 0.70.

Example 2

<Production of Magnetic Recording Medium>

By using an in-line disk sputtering apparatus "C-3102" (manufactured by ANELBA CO., LTD.) and setting a distance between a glass substrate and a metal target (Cr) to 85 mm, the metal target was sputtered at ordinary temperature in an argon atmosphere having a total pressure of 0.094 Pa, thereby forming a Cr metal thin film having a thickness of 150 nm at a deposition rate of 1.5 nm/sec on the glass substrate. Then, an alloy (Fe+8 wt. % Co) target was sputtered onto the Cr metal thin film at 150° C. in an oxygen-rich mixed gas atmosphere containing oxygen and argon and having an oxygen flow rate of 74 CCM, an oxygen partial pressure of 0.12 Pa and a total pressure of 0.40 Pa.

Successively, an alloy (Fe+3 wt. % Co) target was sputtered at 150° C. in a mixed gas atmosphere containing oxygen and argon and having an oxygen flow rate of 22 CCM, an oxygen partial pressure of 0.03 Pa and a total pressure of 0.40 Pa, thereby forming a 18 nm- Co-containing maghemite thin film at a deposition rate of 2 nm/sec on the Cr metal thin film.

The thus obtained Co-containing maghemite thin film was a longitudinal recording medium having a thickness of 18 nm, and was constituted by grains having an average grain size of 18 nm. As to the surface roughness of the Co-containing maghemite thin film, the center-line mean ($R_a$) thereof was 1.10 nm; and the maximum height ($R_{max}$) thereof was 11.6 nm. In addition, the Co-containing maghemite thin film was a longitudinal recording medium and exhibited a coercive force of 438 kA/m (5,498 Oe), a coercive squareness S* of 0.76, and a surface electrical resistance value of 13.0 kΩ.

Example 3

The same procedure as defined in Example 1 was conducted except that the thickness of the Co-containing magnetite thin film was changed, and the transformation into maghemite was conducted in air at 320° C. for one hour, thereby obtaining a Co-containing maghemite longitudinal recording medium.

Example 4

A MgO sintered target was sputtered in an argon atmosphere having a total pressure of 0.37 Pa, thereby forming a 5 nm-thick MgO thin film at a deposition rate of 0.03 nm/sec on a glass substrate. Then, the Co-containing maghemite thin film was formed by the same method as defined in Example 1 except that the amount of cobalt and the thickness of the thin film were changed, thereby obtaining a maghemite perpendicular recording medium.

Example 5

The same procedure as defined in Example 4 was conducted except that the thickness of the thin film and the transformation into maghemite was conducted in air at 320° C. for one hour, thereby obtaining a maghemite perpendicular recording medium.

Example 6

A Cr alloy target was sputtered at ordinary temperature in an argon atmosphere having a total pressure of 0.37 Pa, thereby forming a Cr alloy thin film at a deposition rate of 3 nm on a glass substrate. Then, the same procedure as defined in Example 1 was conducted except that the amount of cobalt and the thickness of the thin film were changed, thereby obtaining a maghemite longitudinal recording medium.

Example 7

The same procedure as defined in Example 8 was conducted except that the transformation into maghemite was conducted in air at 320° C. for one hour, thereby obtaining a maghemite longitudinal recording medium.

Comparative Examples 1 to 4

In Comparative Example 1, after directly forming a Co-containing magnetite thin film on a substrate, the thin film was oxidized in air at 320° C., thereby obtaining a Co-containing maghemite longitudinal recording medium. In Comparative Example 2, after forming a Co-containing magnetite thin film on an NiO underlayer, the thin film was oxidized in air at 320° C., thereby obtaining a Co-containing maghemite longitudinal recording medium. In Comparative Example 3, after forming a Co-containing magnetite thin film on an MgO underlayer, the thin film was successively oxidized in air at 320° C., thereby obtaining a Co-containing maghemite perpendicular recording medium. In Comparative Example 4, after forming a Co-containing magnetite thin film on a Cr underlayer, the thin film was successively oxidized in air at 320° C., thereby obtaining a Co-containing maghemite longitudinal recording medium.

Essential production conditions are shown in Table 1, and various properties of the obtained magnetic recording media are shown in Table 2.

Example 8

An MgO sintered target was sputtered in an argon atmosphere having a total pressure of 0.37 Pa, thereby forming a 5 nm-thick MgO thin film at a deposition rate of 0.03 nm/sec on a glass substrate. Next, the same procedure as defined in Example 1 was conducted except that the thickness of the Co-containing magnetite thin film were changed, and the transformation into maghemite was conducted in air at 320° C. for one hour, thereby obtaining a magnetic recording medium. It was confirmed that the obtained magnetic recording medium was of a Co-containing maghemite perpendicular recording medium in which the (200) plane of the MgO thin film was oriented parallel to the surface of the substrate, and the (400) plane of the Co-containing maghemite perpendicular recording medium was preferentially oriented parallel to the surface of the substrate.

Example 9

A Cr metal target was sputtered in an argon atmosphere having a total pressure of 0.37 Pa, thereby forming a Cr metal film at a deposition rate of 3 nm/sec on a glass substrate. Next, the sputtering treatment for treating the underlayer in an oxygen-rich atmosphere and the transformation into maghemite were conducted by the same method as defined in Example 1 except that the thickness of the Co-containing magnetite thin film was changed, thereby obtaining a Co-containing maghemite longitudinal recording medium.

Example 10

The same procedure as defined in Example 9 was conducted except that the transformation into maghemite was conducted in air at 320° C. for one hour, thereby obtaining a Co-containing maghemite longitudinal recording medium.

Comparative Example 5

The Co-containing magnetite thin film was formed on the Cr underlayer without conducting the sputtering treatment onto the underlayer in an oxygen-rich atmosphere, and then oxidized in air at 320° C., thereby obtaining a Co-containing maghemite longitudinal recording medium.

Examples 11 to 14 and Comparative Examples 6 to 10

The same procedure as defined in Example 2 was conducted except that conditions for the sputtering treatment onto the underlayer in an oxygen-rich atmosphere, and conditions upon forming the spinel-type iron oxide thin film were changed variously, thereby obtaining Co-containing maghemite longitudinal recording media.

Meanwhile, in Comparative Example 6, after directly forming a Co-containing magnetite thin film on the Cr underlayer without subjecting the underlayer to sputtering treatment in an oxygen-rich atmosphere, the thin film was oxidized in air at 320° C., thereby obtaining a Co-containing magnetite longitudinal recording medium. In Comparative Examples 7 and 8, the same procedure as defined in Example 2 was conducted except that the Co-containing magnetite thin film was formed without subjecting the underlayer to sputtering treatment in an oxygen-rich atmosphere thereby obtaining magnetite longitudinal recording media. In Comparative Example 9, after subjecting the NiO underlayer to sputtering treatment, the Co-containing magnetite longitudinal recording medium was formed thereon by the same method as defined in Example 2. In Comparative Example 10, after subjecting the MgO underlayer to sputtering treatment, the Co-containing magnetite longitudinal recording medium was formed thereon by the same method as defined in Example 2.

Comparative Example 11

Follow-up Test of Example 4 of Japanese Patent Application Laid-Open (KOKAI) No. 11-328652(1999))

The NiO underlayer was formed on the substrate by the same method as defined in Comparative Example 9. Then, the 20 nm-thick Co-containing magnetite thin film was formed on the NiO underlayer by the same method as defined in Comparative Example 9. The thus obtained Co-containing Co-containing magnetite thin film was irradiated for one minute by an electron cyclotron resonance (ECR) ion-shower apparatus "EIS-200ER" (manufactured by ELIONICS CO., LTD.) at a substrate temperature of 200° C., a total pressure of $3 \times 10^{-4}$ Torr, a microwave power of 100 W and an ion accelerating voltage of –300 V, by using He as a rare gas at a rare gas flow ratio of 50%, thereby oxidizing the Co-containing magnetite thin film into a Co-containing maghemite thin film to obtain a Co-containing maghemite longitudinal recording medium.

Comparative Example 12

Follow-up Test of Example 9 of EP 1089262)

The NiO underlayer was formed on the substrate by the same method as defined in Comparative Example 9. Then, the 20 nm-thick Co-containing magnetite thin film was formed on the NiO underlayer by the same method as defined in Comparative Example 9. The thus obtained Co-containing magnetite thin film was placed in an RF sputtering apparatus and irradiated for 3 minutes with oxygen plasma produced by introducing oxygen thereinto in an etching mode (at a substrate temperature of 180° C., a gas pressure of 9 mTorr and a ratio of oxygen to argon of 100:0). After completion of the plasma treatment, the Co-containing magnetite thin film was oxidized in air at 320° C. for 60 minutes, thereby obtaining a Co-containing maghemite longitudinal recording medium.

Essential production conditions are shown in Table 5, and various properties of the obtained magnetic recording media are shown in Table 6.

TABLE 1

Production conditions of magnetic recording medium

| Examples and Comparative Examples | Kind of underlayer | Sputtering conditions for treating underlayer in oxygen-rich atmosphere | | | Production conditions of magnetic recording medium Film-forming conditions for recording layer | | Production conditions of magnetic recording medium | |
|---|---|---|---|---|---|---|---|---|
| | | Co content (wt. %) | Oxygen flow rate (CCM) | Substrate temperature (° C.) | Oxygen flow rate (CCM) | Substrate temperature (° C.) | Surface oxidation process | Oxidation process temperature (° C.) |
| Example 3 | NiO | 8 | 74 | R.T. | 22 | 100 | Heat treatment in air | 320 |
| Example 4 | MgO | 3 | 74 | R.T. | 22 | 100 | Sputtering in oxygen-rich atmosphere | 150 |
| Example 5 | MgO | 3 | 74 | R.T. | 22 | 100 | Heat treatment in air | 320 |
| Example 6 | Cr | 3 | 74 | R.T. | 22 | 100 | Sputtering in oxygen-rich atmosphere | 150 |
| Example 7 | Cr | 3 | 74 | R.T. | 22 | 100 | Heat treatment in air | 320 |
| Comparative Example 1 | None | 8 | — | — | 22 | 150 | Heat treatment in air | 320 |
| Comparative Example 2 | NiO | 8 | — | — | 22 | 150 | Heat treatment in air | 320 |
| Comparative Example 3 | MgO | 3 | — | — | 22 | 150 | Heat treatment in air | 320 |
| Comparative Example 4 | Cr | 3 | — | — | 22 | 150 | Heat treatment in air | 320 |

TABLE 2

| Examples and Comparative Examples | Properties of magnetic recording medium | | Properties of magnetic recording medium | |
|---|---|---|---|---|
| | Thickness of underlayer (nm) | Product | Kind of recording media | Co content (wt. %) | Thickness of recording layer (t) (nm) |
| Example 3 | 50 | Co-containing maghemite | Longitudinal recording medium | 8 | 28 |
| Example 4 | 5 | Co-containing maghemite | Perpendicular recording medium | 3 | 28 |
| Example 5 | 5 | Co-containing maghemite | Perpendicular recording medium | 3 | 30 |
| Example 6 | 50 | Co-containing maghemite | Longitudinal recording medium | 3 | 28 |
| Example 7 | 50 | Co-containing maghemite | Longitudinal recording medium | 3 | 28 |
| Comparative Example 1 | 50 | Co-containing maghemite | Longitudinal recording medium | 8 | 30 |
| Comparative Example 2 | 50 | Co-containing maghemite | Longitudinal recording medium | 8 | 18 |
| Comparative Example 3 | 5 | Co-containing maghemite | Perpendicular recording medium | 3 | 28 |
| Comparative Example 4 | 50 | Co-containing maghemite | Longitudinal recording medium | 3 | 30 |

| Examples and Comparative Examples | Properties of magnetic recording medium Magnetic properties | | | Properties of magnetic recording medium | | | Properties of magnetic recording medium | |
|---|---|---|---|---|---|---|---|---|
| | Coercive force | | Coercive squareness ratio S* (-) | Squareness ratio S (-) | Surface electrical resistance (MΩ) | Surface roughness | | Average grain size (D) (nm) | Standard deviation |
| | kA/m | Oe | | | | $R_a$ (nm) | $R_{max}$ (nm) | | D/t |
| Example 3 | 400.7 | 5,035 | 0.74 | — | 23,000 | 0.6 | 7.4 | 18.5 | 3.5 | 0.66 |
| Example 4 | 345.0 | 4,335 | — | 0.90 | 250 | 0.6 | 7.6 | 16.3 | 2.9 | 0.58 |
| Example 5 | 278.5 | 3,500 | — | 0.77 | 1,430 | 0.5 | 7.3 | 14.9 | 2.1 | 0.50 |
| Example 6 | 149.0 | 1,873 | 0.66 | — | 0.13 | 0.8 | 10.0 | 19.1 | 2.9 | 0.68 |
| Example 7 | 115.3 | 1,449 | 0.65 | — | 0.20 | 0.7 | 9.4 | 18.4 | 3.7 | 0.66 |
| Comparative Example 1 | 151.8 | 1,908 | 0.15 | — | 2,600 | 1.6 | 17.7 | 36.7 | 7.9 | 1.22 |

TABLE 2-continued

| | | | | | | | | | |
|---|---|---|---|---|---|---|---|---|---|
| Comparative Example 2 | 239.7 | 3,012 | 0.18 | — | 2,500 | 0.8 | 9.6 | 28.5 | 5.5 | 1.58 |
| Comparative Example 3 | 291.0 | 3,657 | — | 0.80 | 4,400 | 1.0 | 14.9 | 29.5 | 6.9 | 1.05 |
| Comparative Example 4 | 329.8 | 4,144 | 0.43 | — | 0.25 | 1.8 | 17.1 | 30.6 | 6.6 | 1.02 |

TABLE 3

| | Production conditions of magnetic recording medium | | | | | | | |
|---|---|---|---|---|---|---|---|---|
| | | | Sputtering conditions for treating underlayer in oxygen-rich atmosphere | | Production conditions of magnetic recording medium Film-forming conditions for recording layer | | Production conditions of magnetic recording medium Oxidation process | |
| Examples and Comparative Examples | Kind of underlayer | Co content (wt. %) | Oxygen flow rate (CCM) | Substrate temperature (° C.) | Oxygen flow rate (CCM) | Substrate temperature (° C.) | Surface oxidation process | temperature (° C.) |
| Example 8 | MgO | 3 | 74 | R.T. | 22 | 100 | Heat treatment in air | 320 |
| Example 9 | Cr | 3 | 74 | R.T. | 22 | 100 | Sputtering in oxygen-rich atmosphere | 150 |
| Example 10 | Cr | 3 | 74 | R.T. | 22 | 100 | Heat treatment in air | 320 |
| Comparative Example 5 | Cr | 8 | — | — | 22 | 150 | Heat treatment in air | 320 |

TABLE 4

| Examples and Comparative Examples | Properties of magnetic recording medium | | | Properties of magnetic recording medium | |
|---|---|---|---|---|---|
| | Thickness of underlayer (nm) | Product | Kind of recording media | Co content (wt. %) | Thickness of recording layer (t) (nm) |
| Example 8 | 5 | Co-containing maghemite | Perpendicular recording medium | 3 | 28 |
| Example 9 | 50 | Co-containing maghemite | Longitudinal recording medium | 8 | 28 |
| Example 10 | 50 | Co-containing maghemite | Longitudinal recording medium | 8 | 28 |
| Comparative Example 5 | 50 | Co-containing maghemite | Longitudinal recording medium | 8 | 20 |

| Examples and Comparative Examples | Properties of magnetic recording medium Magnetic properties | | | Properties of magnetic recording medium | | | Properties of magnetic recording medium | | |
|---|---|---|---|---|---|---|---|---|---|
| | Coercive force | | Coercive squareness ratio S* (-) | Squareness ratio S (-) | Surface electrical resistance (MΩ) | Surface roughness | | Average grain size (D) (nm) | Standard deviation (nm) | D/t |
| | kA/m | Oe | | | | $R_a$ (nm) | $R_{max}$ (nm) | | | |
| Example 8 | 319.6 | 4,016 | — | 0.90 | 1,400 | 0.5 | 7.3 | 14.9 | 2.8 | 0.53 |
| Example 9 | 282.7 | 3,553 | 0.66 | — | 0.13 | 0.8 | 10.0 | 19.1 | 3.6 | 0.68 |
| Example 10 | 302.5 | 3,801 | 0.65 | — | 0.20 | 0.7 | 9.4 | 18.4 | 3.4 | 0.66 |
| Comparative Example 5 | 329.8 | 4,144 | 0.43 | — | 0.30 | 1.8 | 17.1 | 22.7 | 5.8 | 1.14 |

TABLE 5

| Examples and Comparative Examples | Production conditions of magnetic recording medium | | | | Production conditions of magnetic recording medium Film forming conditions for recording layer | | Production conditions of magnetic recording medium | |
|---|---|---|---|---|---|---|---|---|
| | Sputtering conditions for treating underlayer in oxygen-rich atmosphere | | | | | | | |
| | Kind of underlayer | Co content (wt. %) | Oxygen flow rate (CCM) | Substrate temperature (° C.) | Oxygen flow rate (CCM) | Substrate temperature (° C.) | Oxidation process | |
| Example 11 | Cr | 8 | 74 | 200 | 22 | 200 | — | — |
| Example 12 | Cr | 8 | 74 | 200 | 22 | 100 | — | — |
| Example 13 | Cr | 8 | 74 | 200 | 22 | 100 | — | — |
| Example 14 | Cr-Mo | 3 | 74 | 100 | 22 | 150 | — | — |
| Comparative Example 6 | Cr | 8 | — | — | 22 | 150 | Heat treatment in air | 320° C.: 1 hour |
| Comparative Example 7 | Cr | 8 | — | — | 22 | 150 | — | — |
| Comparative Example 8 | Cr | 8 | — | — | 22 | 150 | — | — |
| Comparative Example 9 | NiO | 8 | 74 | 100 | 22 | 150 | — | — |
| Comparative Example 10 | MgO | 3 | 74 | 100 | 22 | 150 | — | — |
| Comparative Example 11 | NiO | 8 | — | — | 22 | 150 | ECR oxidation | 200° C.: 1 minute |
| Comparative Example 12 | NiO | 8 | — | — | 22 | 150 | Heat treatment in air after plasma treatment | 320° C.: 1 hour |

TABLE 6

| Examples and Comparative Examples | Properties of magnetic recording medium | | | Properties of magnetic recording medium | |
|---|---|---|---|---|---|
| | Thickness of underlayer (nm) | Product | Kind of recording media | Co content (wt. %) | Thickness of recording layer (nm) |
| Example 11 | 150 | Co-containing maghemite | Longitudinal recording medium | 8 | 28 |
| Example 12 | 150 | Co-containing maghemite | Longitudinal recording medium | 8 | 18 |
| Example 13 | 50 | Co-containing maghemite | Longitudinal recording medium | 8 | 28 |
| Example 14 | 50 | Co-containing maghemite | Longitudinal recording medium | 3 | 20 |
| Comparative Example 6 | 50 | Co-containing maghemite | Longitudinal recording medium | 3 | 18 |
| Comparative Example 7 | 150 | Co-containing magnetite | Longitudinal recording medium | 8 | 28 |
| Comparative Example 8 | 50 | Co-containing magnetite | Longitudinal recording medium | 8 | 28 |
| Comparative Example 9 | 50 | Co-containing maghemite | Longitudinal recording medium | 8 | 28 |
| Comparative Example 10 | 5 | Co-containing maghemite | Longitudinal recording medium | 3 | 28 |
| Comparative Example 11 | 20 | Co-containing maghemite | Longitudinal recording medium | 8 | 20 |
| Comparative Example 12 | 100 | Co-containing maghemite | Longitudinal recording medium | 8 | 20 |

| Examples and Comparative Examples | Properties of magnetic recording medium Magnetic properties | | Properties of magnetic recording medium | Properties of magnetic recording medium | | | | |
|---|---|---|---|---|---|---|---|---|
| | Coercive force | Coercive squareness ratio S* (−) | Surface electrical resistance (MΩ) | Surface roughness | | Average grain size (D) (nm) | Standard deviation (nm) | D/t |
| | kA/m   Oe | | | $R_a$ (nm) | $R_{max}$ (nm) | | | |
| Example 11 | 353.6   4,444 | 0.78 | 0.049 | 1.20 | 12.80 | 13.4 | 2.9 | 0.48 |

TABLE 6-continued

| | | | | | | | | | |
|---|---|---|---|---|---|---|---|---|---|
| Example 12 | 403.7 | 5,073 | 0.67 | 0.12 | 1.10 | 13.10 | 7.6 | 2.8 | 0.42 |
| Example 13 | 384.4 | 4,830 | 0.79 | 0.048 | 0.80 | 11.30 | 17.4 | 3.1 | 0.62 |
| Example 14 | 239.5 | 3,010 | 0.74 | 0.34 | 0.80 | 9.60 | 10.2 | 2.5 | 0.51 |
| Comparative Example 6 | 150.0 | 1,885 | 0.65 | 0.25 | 2.80 | 27.5 | 29.2 | 7.8 | 1.62 |
| Comparative Example 7 | 90.8 | 1,141 | 0.68 | 0.00040 | 0.80 | 10.0 | 25.8 | 3.5 | 0.92 |
| Comparative Example 8 | 94.3 | 1,185 | 0.66 | 0.00047 | 0.60 | 8.00 | 24.4 | 3.5 | 0.87 |
| Comparative Example 9 | 131.8 | 1,656 | 0.57 | 0.038 | 0.50 | 5.80 | 28.6 | 4.2 | 1.02 |
| Comparative Example 10 | 15.6 | 196 | 0.26 | 0.34 | 0.42 | 5.60 | 24.6 | 3.8 | 0.88 |
| Comparative Example 11 | 516.1 | 6,485 | 0.20 | 2.3 | 0.51 | 6.05 | 12.4 | 3.2 | 0.62 |
| Comparative Example 12 | 380.8 | 4,785 | 0.39 | 50 | 0.50 | 6.40 | 23.6 | 4.0 | 1.18 |

What is claimed is:

1. A magnetic recording medium, comprising:

a substrate;

an underlayer formed on the substrate; and a spinel-type iron oxide thin film comprising maghemite as a main component formed on the underlayer, said spinel-type iron oxide thin film having a thickness (t) of 5 to 50 nm, being constituted by grains having an average grain size (D) of 5 to 30 nm, a standard deviation of grain sizes of not more than 4 nm and a ratio (D/t) of the average grain size (D) to the thickness (t) of less than 1.0, and exhibiting a coercive force of not less than 159 kA/m (2,000 Oe) and a coercive squareness ratio S* of not less than 0.5:1 in a longitudinal recording medium or a squareness ratio not less than 0.75:1 in a perpendicular recording medium.

2. A magnetic recording medium according to claim 1, wherein said spinel-type iron oxide thin film comprising maghemite as a main component has a center-line mean ($R_a$) of 0.1 to 1.0 nm and a maximum height ($R_{max}$) of 1 to 12 nm.

3. A magnetic recording medium according to claim 1, wherein said underlayer is a single-layered or multi-layered film comprising an oxide thin film of a NaCl-type structure, a metal or alloy thin film of a bcc structure, and a metal or alloy thin film of a B2 structure.

4. A magnetic recording medium according to claim 1, which further has a coercive force of 199 to 955 kA/m (2,500 to 12,000 Oe), and a saturation magnetization (value of magnetization when applying a magnetic field of 1,590 kA/m (20 kOe) thereto) of 29 to 53 Wb/cm$^3$ (230 to 420 emu/cm$^3$).

5. A process for producing a magnetic recording medium, comprising:

forming an underlayer on a substrate;

subjecting the underlayer to sputtering treatment in an oxygen-rich atmosphere using a Fe target, a Fe alloy target or a target comprising iron oxide as a main component;

conducting a reactive sputtering using a Fe target, a Fe alloy target or a sputtering using a target comprising iron oxide as a main component to form a spinel-type iron oxide thin film comprising magnetite as a main component on the underlayer; and oxidizing the spinel-type iron oxide thin film comprising magnetite as a main component to transform into a spinel-type iron oxide thin film comprising maghemite as a main component wherein the spinel-type iron oxide thin film has a thickness (t) of 5 to 50 nm, is constituted by grains having an average grain size (D) of 5 to 30 nm, a standard deviation of grain sizes of not more than 4 nm and a ratio (D/t) of the average grain size (D) to the thickness (t) of less than 1.0, and exhibits a coercive force of not less than 159 kA/m (2.000 Oe) and a coercive squareness ratio S* of not less than 0.5:1 in a longitudinal recording medium or a squareness ratio not less than 0.75:1 in a perpendicular recording medium.

6. A process according to claim 5, wherein the sputtering treatment for treating the underlayer in an oxygen-rich atmosphere is conducted at a substrate temperature of 20 to 200° C., and the formation of the spinel-type iron oxide thin film comprising magnetite as a main component is conducted at a substrate temperature of 30 to 250° C.

7. A process for producing a magnetic recording medium, comprising:

forming an underlayer comprising a Cr metal thin film or a Cr alloy thin film on a substrate;

subjecting the underlayer to sputtering treatment in an oxygen-rich atmosphere using an Fe target, an Fe alloy target or a target comprising iron oxide as a main component; and conducting a reactive sputtering using an Fe target, an Fe alloy target or a sputtering using a target comprising iron oxide as a main component to form a spinel-type iron oxide thin film comprising maghemite as a main component on the underlayer wherein the spinel-type iron oxide thin film has a thickness (t) of 5 to 50 nm, is constituted by grains having an average grain size (D) of 5 to 30 nm, a standard deviation of grain sizes of not more than 4 nm and a ratio (D/t) of the average grain size (D) to the thickness (t) of less than 1.0, and exhibits a coercive force of not less than 159 kA/m (2000 Oe) and a coercive squareness ratio S* of not less than 0.5:1 in a longitudinal recording medium or a squareness ratio not less than 0.75:1 in a perpendicular recording medium.

8. A process according to claim 7, wherein the sputtering treatment for treating the underlayer in an oxygen-rich atmosphere is conducted at a substrate temperature of 100 to 250° C., and the formation of the spinel-type iron oxide thin film comprising maghemite as a main component is conducted at a substrate temperature of 100 to 250° C.

* * * * *